United States Patent [19]
Anichini

[11] 3,958,337
[45] May 25, 1976

[54] MEASURING SYSTEM FOR DIRECT FEELING GAUGE

[75] Inventor: Cesare Anichini, Florence, Italy

[73] Assignee: Finike Italiana Marposs-Soc. In Accomandita Semplice di Mario Possati & C., Bentivoglio, Italy

[22] Filed: Sept. 25, 1974

[21] Appl. No.: 509,216

[30] Foreign Application Priority Data
Oct. 25, 1973 Italy.................................... 3520/73

[52] U.S. Cl. ............................ 33/143 L; 33/147 K; 33/149 J; 33/174 L
[51] Int. Cl.² ......................................... G01B 7/12
[58] Field of Search .......... 33/143 L, 143 R, 147 K; 33/147 N, 149 J, DIG. 13, 174 L, 178 E

[56] References Cited
UNITED STATES PATENTS

| | | | |
|---|---|---|---|
| 2,640,271 | 6/1953 | Boucher........................... | 33/174 L |
| 2,674,046 | 4/1954 | Kaye................................ | 33/147 K |
| 3,081,548 | 3/1963 | Schwartz.......................... | 33/147 K |

*Primary Examiner*—Richard E. Aegerter
*Assistant Examiner*—Willis Little
*Attorney, Agent, or Firm*—Stevens, Davis, Miller & Mosher

[57] ABSTRACT

A movable measuring system for a gauge of the direct feeling type including first and second movable elements supported by a frame and supporting in turn respective feelers adapted to contact the workpieces to be measured, substantially rigid members associated with the movable elements and joined together through a link adapted to allow displacements of the feelers and of the movable elements and to transform them into displacements comprising rotations of the rigid members around an axis defined by the link and a transducer to detect the displacements of the axis. The movable elements are displaceable to allow the feelers to approach and to move away from each other. The axis is on its turn movable with respect to the frame. The transducer has a movable element suspended to an inextensible wire stretched by a spring connected between the movable element of the transducer and the frame of the gauge. The wire is adapted to move longitudinally according to the displacements of the axis defined by the link. The link is constituted by a thin elastic lamina substantially bent with a U-shape or a V-shape, the external faces of the U or V being welded to relevant faces of the rigid members. The axis of rotation relative to the rigid members is defined by the longitudinal axis of the central section of the lamina.

12 Claims, 7 Drawing Figures

MEASURING SYSTEM FOR DIRECT FEELING GAUGE

The present invention relates to a measuring system for a gauge of the direct feeling type. More particularly, it relates to a system adapted to checking inside diameters, wherein the displacement of the feelers causes a corresponding displacement of one or more movable elements of electrical transducers comprised in the gauge.

Gauges of the direct feeling type are known, in which the feelers are supported by means of rigid arms, movable about pins or fulcra, and in which one or more movable elements of transducers move in dependence on the displacements of the feelers.

Such gauges present disadvantages when checking small diameters because of the little room available which causes problems and shows a need for reducing the dimensions of the movable elements, in contrast with the requirements of stoutness, repeatability and accuracy essential for the measuring systems.

It is therefore an object of this invention to achieve a measuring system for a direct feeling gauge particularly adapted to be used for the measurement of small diameters, such as in the range of 10 mm. which combines structural simplicity, stoutness with great accuracy and absolute repeatability even after long working.

This and other objects and advantages are achieved by a measuring system for a gauge of the direct feeling type, comprising first and second movable elements, supported by a frame and supporting in turn respective feelers adapted to contact the workpieces to be measured. The movable elements are displaceable to allow the feelers to approach and to move away. The movable elements are associated with substantially rigid members joined together through linking means adapted to allow displacement of the feelers and of the movable elements and to transform them into displacements comprising rotation of the rigid members around an axis defined by the linking means. The axis is on its turn movable with respect to the frame, detecting means being provided to detect the displacements of the axis.

The invention now will be described more in detail by reference to the accompanying drawings in which.

Figure 1:
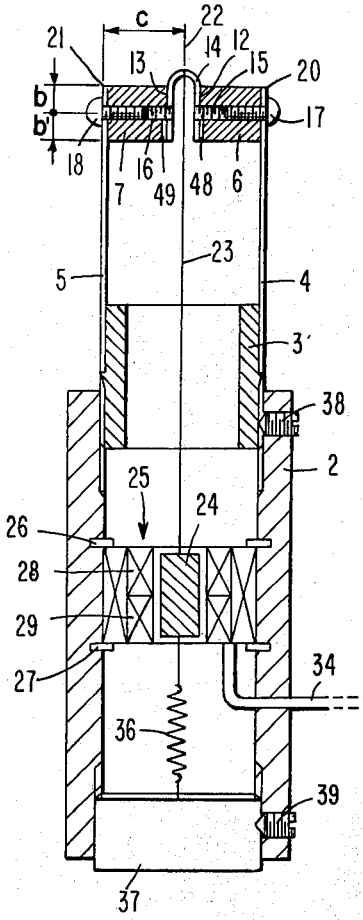
FIG. 1 is a sectional view of a gauge equipped with a measuring system according to one embodiment of the present invention.

Referring to FIG. 1, a hollow cylinder 2 threaded at both ends, represents the exterior frame of the measuring head of the gauges. A supporting frame 3, substantially of a hollow cylindrical shape and externally threaded, is screwed to one end of cylinder 2.

Respective ends of two thin and elastic laminae 4 and 5 are welded to two plane chamfers of the external surface of frame 3, at diametrical opposed positions. The other ends of laminae 4 and 5 are welded to two surfaces of rigid members 6 and 7 parallelepiped-shaped, which are of such a length that their opposed surfaces stand very close together.

The facing surfaces of members 6 and 7 are welded to respective external sides 12 and 13 of a thin, elastic, U-bent lamina 14. Two threaded holes 15 and 16 are made axially in members 6 and 7 through laminae 4 and 5. Feelers 17 and 18 are fastened in these holes.

The end of an inextensible wire 23 is centrally secured to the top of the U-shaped lamina 14. The wire, passing inside the U-shaped lamina, and frame 3, supports a magnetic core 24. A differential transducer 25 is housed, by means of retaining rings 26 and 27 in the frame 2.

At rest core 24 is situated inside transformer 25, symmetrically with respect to two secondary windings 28 and 29. Cables 34 connect transducer 25 to a feeding and detection unit 35.

The core 24 is linked by means of spring 36 to threaded cover 37 which closes the other end of gauge frame 2.

Two fastening screws 38 and 39 are provided for securing the elements 3 and 37 in the correct position with respect to differential transducer 25.

Figure 2:
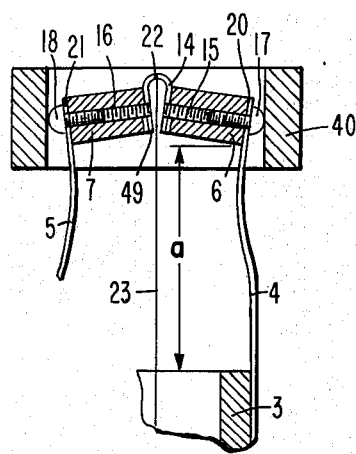
FIG. 2 is a detailed view of the movable measuring system of the gauge of FIG. 1 during a measurement.

With reference to FIG. 2 showing the working of the gauge 40 shows a ring of which the inside diameter is to be measured.

When the top of the measuring system (which can be protected by an external ogival plug, not shown) is inserted in the bore to be measured, feelers 17 and 18 contact the wall of the bore and are forced to approach, transmitting their displacement to members 6 and 7 with which they are connected.

This displacement is allowed owing to the flexibility of the lamina 14 which closes further around its top, so that members 6 and 7 rotate substantially around the longitudinal axis of path 22 through the central section of the lamina. In the final configuration the two members 6 and 7 are no longer aligned but mutually rotated a certain angle. The laminae 4 and 5 bend as shown in FIG. 2.

Obviously in FIG. 2 all the displacements have been magnified for clearness reasons. As a matter of fact they are very small. Also the connecting sections of laminae 4 and 5 to members 6 and 7 move and rotate very small amounts so that, because of the fairly long length of the laminae, the dimension $a$ in FIG. 2 remains substantially unchanged. As shown in FIG. 2, the approach of feelers 17 and 18 towards each other produces a longitudinally extending displacement of the top of the lamina 14, axis 22 and wire 23 which is secured to the lamina exactly at the section containing the axis.

The core 24, fixed to wire 23, also is displaced and causes a variation of the output voltage of differential transducer 25. This variation is detected by unit 35. This method is particularly useful when the lightness of the movable measuring system and the absence of external returning means, such as springs, require that the mass and inertia of the elements to be displaced be very small.

Of course, from a theoretical point of view, a stem, linked to the lamina 14 at one end and freely sliding within a sleeve fixed to frame 2, supporting at the proper height the core 24, would work as well.

The ratio between the displacements of feelers 17 and 18 and of wire 23 depend on the dimensions $b$, $b'$, $c$ of FIG. 1.

Such a ratio can be regarded as constant in the usual operating range of the gauge.

Therefore there is linear correspondence between displacements of feelers 17 and 18 and of wire 23.

Particularly a ratio, that is a unitary amplification coefficient, can be obtained by making $b = b' = \frac{1}{2} \cdot c$.

In this way a certain change of the measured diameter causes an equal displacement of the wire.

Some numerical examples will be helpful to clarify what has been said with regard to the real displacements of the various elements of the moving measuring system and of the linearity error which follows.

With a measuring head in which the dimensions $a$, $b$, $b'$, and $c$ of FIGS. 1 and 2 are, respectively: $a = 8$ mm., $b = b' = 2$ mm., $c = 4$ mm., for the measurement of a diameter of $\Delta\phi = 48\mu$ smaller than the distance between feelers 17 and 18, in the rest condition of the measuring system the calculated displacement of the axis 22, to which wire 23 is fixed, is $47\mu$. Therefore, the linearity error is about 2%.

If the difference $\Delta\phi$ is equal to $24\mu$ the wire rises $23.75\mu$ and the linearity error is $0.25\mu$ namely about 1%.

When $\Delta\phi$ is still smaller the linearity error lowers accordingly, and for $\Delta\phi = 15\mu$ it is less than $0.1\mu$. That is quite insignificant.

In conclusion, the linearity error which is always negative, rises in absolute value with a quadratic ratio with respect to $\Delta\phi$ and for $\Delta\phi$ of a few tens of $\mu$ it can be disregarded.

Therefore a linear transducer can generally be used for detecting the dimensions of the workpieces.

In particular cases, should $\Delta\phi$ be very large, the linearity error can be compensated with well known systems.

Figure 3:
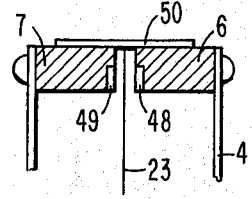
FIG. 3 is another embodiment of the movable measuring system according to the present invention.

Another way for linking together members 6 and 7 is shown in FIG. 3. Instead of a U-bent lamina 14, a plane lamina 50 can be used, welded to the external faces of members 6 and 7. The working of the movable measuring system is the same because the only section of the lamina that can bend is, like in the head of FIG. 1, the central section between the two welded parts.

Figure 4:
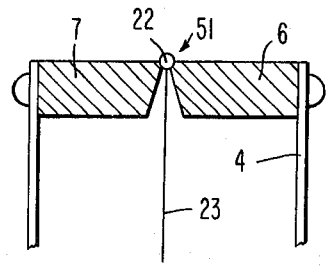
FIG. 4 is a further embodiment of the movable measuring system according to the present invention.

Otherwise the two members 6 and 7 can be directly hinged, as shown in FIG. 4, and wire 23 secured to hinge 51.

These variants are quite equivalent and the reasons for choosing the one or the other depend especially on the easiness of construction. For instance, to obtain measuring systems of the type shown in FIG. 1, two bars 55 and 56 (FIG. 5) and a lamina 57 of considerable length can be used.

Lamina 57 is permanently deformed by having it bent around a thin core 58. Lamina 57 is then welded to the two bars by means of oven welding.

Figure 5:
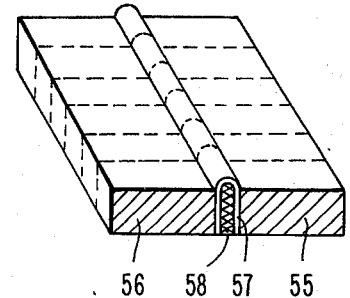
FIG. 5 illustrates a constructive process for obtaining part of the movable measuring system of FIG. 1.

Afterwards bars 55 and 56 and lamina 57 are cut along the paths shown in FIG. 5 and a certain number of parts formed by members 6 and 7 with relevant lamina 14 already welded are obtained. All parts have the same physical and geometrical characteristics. In the measuring system of FIG. 6 the top of lamina 14 is turned inwards instead of outwards.

In this case the approaching of feelers 17 and 18 from their position of rest causes a displacement of the top of the lamina inwards instead of outwards.

The same result can be achieved in the measuring system of FIG. 3 if the lamina 50 is welded to the faces of rigid members 6 and 7 facing the interior of the measuring head.

Figure 6:
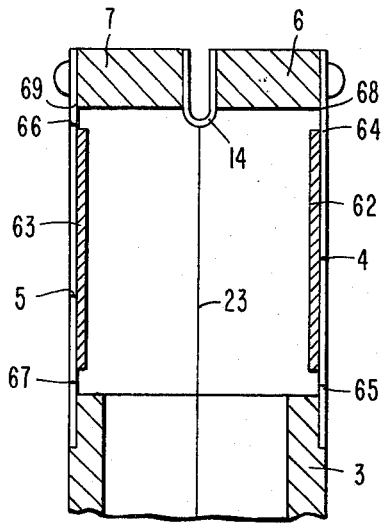
FIG. 6 is a still further embodiment for the construction of the measuring system according to the present invention.

According to the variant in FIG. 6, two bars 62 and 63 are welded along the vertical laminae 4 and 5 to make them rigid except for two sections 64 and 65 and 66 and 67 respectively, where they remain free to bend.

In this way the movable measuring system becomes stronger against axial impacts and acts like a sort of articulated parallelogram with the sides mutually displaceable and rotatable around the five sections in which laminae 4 and 5 and 14 are not welded to other members.

Of course, also laminae 4 and 5 as said above with regard to lamina 14, from a theoretical standpoint, can be replaced by rigid arms with their ends linked through hinges to frame 3 and members 6 and 7.

In this case the force required for bringing again the measuring system to its rest position after each measurement should be supplied by return springs.

This force, which also thrusts the feelers against the surfaces of the workpiece to be measured, is supplied in the other cases by the elastic energy stored by laminae 4, 5 and 14, when they are bent.

Feelers 17 and 18 as shown in FIG. 1, substantially consists of threaded stems on which are fixed the real feelers having a spherical shape. The threaded stems are screwed in proper holes 15 and 16 made in members 6 and 7.

By changing the length of the threaded stems, screwing in or out and locking them suitably, the operating range of the gauge can be enlarged.

In the measuring systems of FIGS. 1, 2 and 3 it is advisable to make grooves in the internal ends of lamina 14 and/or in members 6 and 7 for receiving wire 23, to make sure that, owing to the approaching of feelers, wire 23 is not caught between the lamina 14 or the rigid members 6 and 7 with the possible consequence of being truncated or causing an incorrect measurement.

In this way the ends of lamina 14 or members 6 and 7 can act as limiting devices, restricting in this way the maximum bending of lamina 14 so that such a bending be always within the range of elastic deformation.

Figure 7:
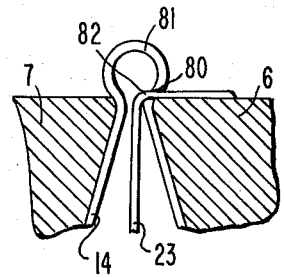
FIG. 7 refers to the preferred embodiment of FIG. 1 and shows some useful variants.

With refrence to FIG. 7, lamina 14 has about a V-shape with a eyelet at the top, the eyelet being the part of the lamina capable of being bent.

The internal facing surfaces of members 6 and 7 are raking, as in FIG. 4, so that if the members 6 and 7 approach as much as the opposite sides of the lamina touch, the contact occurs along the whole internal surfaces of the lamina and not only along the inferior edges.

In FIG. 7 it also is shown that wire 23 passes through a hole 80 made in a side of the lamina 14 and is welded to the external face of the member 6.

Also in this case the wire effects the same displacements as the relative axis of rotation of the two members 6 and 7, the path of which is marked with number 81.

As a matter of fact the bend of the wire 82 lies on the same eyelet diameter on which the axis 81 lies and, because of the small rotations, the eyelet undergoes, the change of the diameter is quite negligible with respect to the other displacements. In this way a certain length of the end of the wire can be welded and moreover the area of welding, being not subject to bending, is less stressed.

The eyelet shape is a further warranty that the flexion of the lamina never reaches such a value as to cause a permanent deformation.

Obviously in the embodiment of FIG. 6 (as far as it concerns lamina 14) and in the similar possible variant to the measuring system of FIG. 3, the grooves 48 and 49 would be useless. The edges of the lamina 14, or of the members 6 and 7 situated outside of the measuring head, can act to limit the displacement.

What is claimed is:

1. A gauge of the direct feeling type, comprising:
   a frame;
   first and second elongated flexible elements, rigidly supported at one end by the frame and extending therefrom flexibly parallel to each other;
   first and second feelers, rigidly connected with the other end of said flexible elements, for contacting the workpiece to be measured, said feelers approaching and moving away from each other, thereby flexing said flexible elements;
   two rigid members rigidly supported by said flexible elements at their said other end, said members being arranged between the flexible elements;
   flexible linking means joining together said rigid members for allowing said approaching and moving away displacements of the feelers and the flexing of the flexible elements, said rigid members pivotally movable about a section of the linking means defining an axis lying midway between the ends of and within said linking means, said section being movable toward and away from said frame dependent upon the movement of said feelers; and
   electrical detecting means, including an element fixed to the frame and an element linked to said section at the location of said axis and movable with the same, to detect the displacements of said section.

2. The gauge according to claim 1, wherein said detecting means comprises a differential transformer and the element linked to said section is a movable core of the transformer; and includes an inextensible wire connected between one side of said core and said section of the linking means at the point of said axis; a spring connected between the other side of the core and the frame for maintaining taut said wire; said wire transmitting to the movable core movements according to the displacements of said section.

3. The gauge according to claim 2, wherein said linking means are constituted by a thin elastic lamina substantially bent with a U-shape, the external faces of said U being welded to relevant faces of said rigid members.

4. The gauge according to claim 3, wherein said U opens outwardly, the approaching of said feelers from a position of rest causing an inward displacement of the top of U.

5. The gauge according to claim 3, wherein said U opens inwardly, that is towards said supporting frame, the approaching of said feelers from a position of rest causing an outward displacement of the top of the U.

6. The gauge according to claim 4, wherein said top of the lamina is eyelet-shaped, the eyelet having at least one lateral hole to allow the passing of said wire, the relevant end of this one being secured to at least one of said rigid members.

7. The gauge according to claim 2, wherein said rigid members and said linking means comprise facing surfaces adapted to come into contact to act as displacement limiting devices.

8. The gauge according to claim 7, wherein said facing surfaces of said rigid members adapted to come into contact define grooves adapted to receive said inextensible wire.

9. The gauge according to claim 1, wherein said linking means are constituted by a thin plane elastic lamina, a face of which is symmetrically welded to faces of said rigid members.

10. The gauge according to claim 1, wherein said flexible elements are constituted by two elastic laminae welded at one end to said supporting frame in diametrically opposed positions and at the other end to a face of the relevant rigid member.

11. A gauge for measuring the internal diameter of a workpiece, comprising:
    a frame;
    feeler carrying means including a pair of oppositely elongated laminae fixed at one end to the frame and extending therefrom, the laminae being elastically flexible to permit the approach of their ends away from the frame and to provide return forces biasing the laminae towards a rest position;
    a pair of feelers fixed at the ends of the laminae away from the frame, respectively, for contacting diametrically opposed points of the workpiece, said return forces providing forces thrusting the feelers against the workpiece;
    connecting means arranged between said ends away from the frame and extending substantially in a radial direction, said connecting means including two rigid members fixed at the ends of the laminae away from the frame and an intermediate element connecting said two members while permitting them movement about an axis perpendicular to said radial direction and lying within said intermediate element; and transducer means for providing a signal responsive to the distance apart of the feelers, including an element supported by said intermediate element movable with the same toward and away from said frame, upon relative radial movements of the feelers, and detecting means for detecting the movements of the movable element.

12. A gauge for measuring the diameter of a bore of a workpiece, comprising:
    a support body;
    a pair of oppositely positioned elongated laminae one end of each of which is fixed to the support body and extends from the support body in a longitudinal direction to terminate in a movable end, the laminae being elastically flexible to permit the approach of the movable ends upon movement of the laminae in a direction perpendicular to the longitudinal direction, the moving of the laminae from a rest position providing return forces;
    connecting means for connecting said movable ends to each other, including two rigid members rigidly fixed to said movable ends and an intermediate element, said intermediate element including a flexible section permitting rotational movement of the members about an intermediate axis defined by the flexible section, the intermediate axis being perpendicular to said longitudinal direction; two feelers fixed at said free ends, respectively, for contacting diametrally opposed points of the bore, the feelers and the laminae being arranged in such a way that when inserting the feelers into the bore the feelers contact the bore surface and are forced to approach each other and the laminae are bent from the rest position, the return forces of the laminae thus providing contact between the feelers and two diametrally opposed points of the bore; and transducer means for providing a signal responsive to the distance apart of the feelers, including a member coupled to said connecting means and moveable with said intermediate element substantially in said longitudinal direction, upon movements of the feelers in said direction perpendicular to the longitudinal direction, and detecting means for detecting the longitudinal movements of the member.

* * * * *

UNITED STATES PATENT AND TRADEMARK OFFICE
CERTIFICATE OF CORRECTION

PATENT NO. : 3,958,337
DATED : May 25, 1976
INVENTOR(S) : Cesare ANICHINI

It is certified that error appears in the above-identified patent and that said Letters Patent are hereby corrected as shown below:

Claim 6, line 1, cancel "4" and insert -- 5 --.

Signed and Sealed this

Thirty-first Day of October 1978

[SEAL]

Attest:

RUTH C. MASON
Attesting Officer

DONALD W. BANNER
Commissioner of Patents and Trademarks